United States Patent [19]

Guicquero

[11] Patent Number: 4,518,725

[45] Date of Patent: May 21, 1985

[54] FLUIDIZING AGENTS FOR HYDRAULIC BONDING MATERIALS; HYDRAULIC BONDING MATERIALS CONTAINING SAID FLUIDIZING AGENTS; METHOD OF MAKING AND USING SAME

[75] Inventor: Jean P. Guicquero, Labarte sur Leze, France

[73] Assignee: Chryso S.A., Toulouse, France

[21] Appl. No.: 517,622

[22] Filed: Jul. 27, 1983

[30] Foreign Application Priority Data

Jul. 28, 1982 [EP] European Pat. Off. ........ 82401401.3

[51] Int. Cl.$^3$ ...................... C04B 13/28; C08G 12/08
[52] U.S. Cl. ........................................... 524/3; 524/4; 524/6; 524/843; 528/256
[58] Field of Search ................... 528/256; 524/3, 4, 6, 524/843

[56] References Cited

U.S. PATENT DOCUMENTS

| | | | |
|---|---|---|---|
| 3,661,829 | 5/1972 | Aignesberger et al. | 524/598 |
| 3,985,696 | 10/1976 | Aignesberger et al. | 528/256 |
| 4,198,332 | 4/1980 | Laqua et al. | 524/501 |
| 4,272,430 | 6/1981 | Pieh et al. | 524/4 |
| 4,430,469 | 2/1984 | Burge et al. | 524/843 |

Primary Examiner—Herbert J. Lilling
Attorney, Agent, or Firm—Sandler & Greenblum

[57] ABSTRACT

Fluidizing agents for hydraulic bonding materials such as, for example, concrete, cements, anhydrites, plasters, limes, or others. The fluidizing agents comprise the water soluble condensation reaction products of aminosulfonic acids, having one or more aromatic nuclei, or a mixture thereof; polyamino products including polyamino acids, polyamides, or polythioamides, or their mono- or polymethylol derivatives, and polyamino derivatives of triazine; and formaldehyde or compounds which generate formaldehyde under reaction conditions. The water soluble fluidizing agents permit a reduction of the quantity of water required for mixing the bonding materials and provide an increased mechanical resistance thereto. The invention includes the bonding materials containing the fluidizing agent, the method of using the fluidizing agents in bonding materials, and method of forming the bonding materials.

31 Claims, No Drawings

FLUIDIZING AGENTS FOR HYDRAULIC BONDING MATERIALS; HYDRAULIC BONDING MATERIALS CONTAINING SAID FLUIDIZING AGENTS; METHOD OF MAKING AND USING SAME

BACKGROUND OF THE INVENTION

1. Field of the Invention

The present invention relates to new fluidizing agents for hydraulic bonding materials such as concrete, cement, anhydrites, plasters, lime and the like, and to the method of making and using such fluidizing agents. The present invention also relates to mineral bonding materials including the fluidizing agents according to the invention, and to a method of rendering a bonding material more fluid.

2. Description of Prior Art

Presently known fluidizing agents essentially consist of the reaction product of polynaphthalene sulfonates and modified melamine resins.

The goal of the invention is to obtain a greater reduction in the amount of water required for admixture with hydraulic bonding materials than that obtained by the known fluidizing agents, as well as to obtain increased mechanical resistance.

SUMMARY OF THE INVENTION

It is, therefore, an object of the invention to provide a fluidizing agent which reduces the amount of water to be used in the ultimate hydraulic bonding material as well as to increase the mechanical bonding power in the hydraulic bonding material.

To this end, the novel fluidizing agents according to the invention are water soluble condensation products of:

(1) aminosulfonic acids having at least one aromatic nucleus;
(2) nitrogenous products having at least two NH$_2$ functions; and
(3) formaldehyde or compounds which generate formaldehyde in reaction conditions.

Most preferably, the fluidizing agent is a water soluble condensation reaction product of:

(1) an aminosulfonic acid having at least one aromatic nucleus, or a mixture of aminosulfonic acids having at least one aromatic nucleus;
(2) polyamines, polyamides, polythioamides, or their mono- or polymethylol derivatives; and
(3) formaldehyde or compounds which generate formaldehyde in reaction conditions.

The fluidizing agent of the invention is preferably for use in hydraulic bonding materials such as concrete, cement, anhydrites, plasters, lime and the like.

The nitrogenous compound is preferably an amine derivative capable of a condensation reaction with formaldehyde. Most preferably the nitrogenous compounds are aminotriazines having at least two amino groups. Preferably the compound is selected from the group consisting of melamine, guanamine, succinoguanamine, or mixtures thereof.

The aminosulfonic acids having an aromatic nucleus can be a mixture of aminosulfonic acids having an aromatic nucleus and aminosulfonic acids having more than one aromatic nucleus. Of the mononuclear sulfonic acid compounds the following compounds are preferred: sulfanilic acid and/or its substituted equivalents or homologs, such as toluidine sulfonic acid and/or aminophenolsulfonic acid and/or 2-amino-4-chlorophenol-6-sulfonic acid. Preferred polynuclear aminosulfonic acids are aminonaphthalene sulfonic acid and its substituted equivalents or homologs; aminonaphthol disulfonic acids such as 1-amino, 8-naphthol-3,5-disulfonic acid; and aminonaphthyl trisulfonic acids. The aminosulfonic acids may be polysulfonic acids such as aniline 2-5 disulfonic acid, and/or diaminostilbene disulfonic acid and/or aminonaphthol disulfonic acid and/or aminonaphthyl trisulfonic acid, and their substituted equivalents or homologs.

The aminosulfonic acids may also be acids having more than one aromatic nucleus joined with an aliphatic bridge, such as aminodiphenylmethane sulfonic acid, or a hetero atom such as oxygen.

The aminosulfonic acids may also have their sulfonic acid function(s) neutralized into a salt by an appropriate base such as sodium hydroxide or potash.

Furthermore, according to the invention a method for manufacturing a fluidizing agent for hydraulic bonding materials is provided which comprises the step of reacting in aqueous solution:

(1) aminosulfonic acids having at least one aromatic nucleus;
(2) nitrogenous products having at least two NH$_2$ functions; and
(3) formaldehyde or compounds which generate formaldehyde in reaction conditions. The reaction is preferably performed at a temperature ranging from about 40° C. to about 115° C. for about one hour, so as to result in the condensation of such compounds, the resulting condensation product comprising said fluidizing agent. The inventive method allows for the synthesis of the inventive fluidizing agents listed above.

Additionally, the invention relates to hydraulic bonding materials which comprise the inventive fluidizing agents listed above, as well as to methods of rendering hydraulic bonding materials more fluid by addition of the inventive fluidizing agents.

Other characteristics of the invention will appear in the following description of the composition of the product and its method of manufacture and use which are illustrated by non-limiting examples and formulas in which the quantities and proportions are given by way of non-limiting example only.

DETAILED DESCRIPTION OF THE INVENTION

The fluidizing agents according to the invention are water soluble condensation products wherein one of the base constituents of the condensation with formaldehyde is comprised of a sulfonated aromatic amino acid substance. These substances are aminosulfonic acids having at least one aromatic nucleus, or a mixture of such acids having the general formula:

$(NH_2)_x A(SO_3H)_y$ in which x and y are integers at least equal to 1, and A is a mono- or polynuclear aromatic radical.

By way of non-limiting example, these acids can be comprised of:

(1) Sulfanilic acid and/or its substituted equivalents such as: toluidine sulfonic acid, aminophenol sulfonic acid, or 2-amino-4-chlorophenol-6-sulfonic acid;
(2) Aminonaphthalene sulfonic acid or its substituted equivalents; or (3) Polysulfonic acids such as aniline-2,5-disulfonic acid, diaminostilbene disulfonic acid, aminonaphthol disulfonic acid, or aminonaphthyl trisulfonic acid and their substituted equivalents.

It is also within the scope of the invention to use aminosulfonic acids having more than one aromatic nucleus, connected among themselves by aliphatic bridges, e.g., aminodiphenylmethane sulfonic acid, or hetero atoms such as oxygen.

In addition to formaldehyde and the aminosulfonic acids described above, the nitrogenous base constituent of the condensation product which comprises the fluidizing agent of the invention is a polyaminofunctional product such as an amino-triazine having at least two $NH_2$ functions and the general formula: $(NH_2)_zB$ in which z is greater than or equal to 2, and B is a triazinyl radical. Other examples of polyaminofunctional compounds include: urea, thiourea, benzoguanamine, melamine, succinoguanamine, and mixtures thereof.

It is equally possible for the polyamino constituent of the condensation product to be a primary polyamide or polythioamide, or their mono- or polymethylol derivatives.

The best results are obtained by condensation of sulfanilic acid, toluidine sulfonic acid, or naphthylaminosulfonic acid or disulfonic acids on the one hand, and melamine or its N-methylol derivatives on the other hand, with formaldehyde or a formaldehyde-generating compound. The condensation of compounds of the type $(NH_2)_xA(SO_3H)_y$, where x, y and A are as defined above, and of products of the type $(NH_2)_zB$, where z and B are defined as above, with formaldehyde or a compound which forms formaldehyde in reaction conditions, such as formaldehyde bisulfite, hexamethylenetetramine, trioxymethylene, etc., can be effected in an acid, neutral or basic medium.

According to one embodiment of the invention, the one or several aromatic aminosulfonic acids are neutralized in water and converted into salt, to yield a solution of about pH 11. The neutralization of the one or several sulfonic acid functions is effected with alkaline or alkaline earth products in the form of oxides or hydroxides such as sodium hydroxide and its solutions, lime or a dispersion of lime, potash, ammonia, barium oxide, etc., or an organic base, under stoichiometric conditions. The condensation reaction is effected in a known manner by combining the base constituents in water solution to react in the required quantitative ratios. The base constituents are condensed in water solution in the proportions of about 1.05–1.3 moles of an aromatic aminosulfonic acid (or a mixture of more than one acid) of the type $(NH_2)_xA(SO_3H)_y$ and about 1 mole of a product of the formula $(NH_2)_zB$, to between about 1.5 and 2z−0.5, where z is defined as above, moles of formaldehyde or a formaldehyde generator, at a temperature between about 40° and about 115° C., and preferably between about 55° and about 95° C. Depending on the solubility of the products obtained, the final concentration is brought to between 25 and 45% with a density between 1.125 and 1.320.

Other additives may have a complementary effect without exceeding the scope of the invention. These additives can be soluble silicates or aluminates, in an amount, for example, of about 0.1 to about 3% of the water solution of the condensation product. Such additives can also be polyethers having a molecular weight of, e.g., between about 150 and 3,000 (preferably about 400 to about 1,000). They can also be hydroxylated polycarboxylic acids, or their salts, at a concentration of, e.g., about 0.05 to about 3% of the water solution of the condensation product. The additives may be amines and their hydroxyalkoxyl derivatives, in a concentration range of, e.g., about 0.05 to 3%. They can also be lignosulfonates, low-foaming surface active agents, and mineral salts. All these additives are compatible and known for their properties of improving the mechanical resistance of hydraulic bonding materials.

EXAMPLES

The following examples of preparation and application are intended to provide and will permit better and improved understanding of the invention without limiting its scope. The proportions are given in moles.

EXAMPLE 1

1.15 moles of neutralized sulfanilic acid and a 30% aqueous solution of 3.5 moles of formaldehyde are added to 1 mole of melamine dispersed in 250 grams of water. The reaction mixture is brought to about 65° C. for one hour. The final pH is between 8 and 9 and the concentration is adjusted to 30% by adding water.

EXAMPLE 2

1.05 moles of sulfanilic acid and 0.15 mole of 1-amino, 8-naphthol-3,5-disulfonic acid, both neutralized by 1.35 moles of sodium hydroxide, and 3.5 moles of formaldehyde in an aqueous solution are added to one mole of melamine dispersed in 250 grams of water. The reaction mixture is brought to about 65° C. for one hour. The final pH is between 8 and 9 and the concentration is adjusted to 30% by adding water.

The aqueous solutions thus obtained in Examples 1 and 2 can be added to a hydraulic bonding material in a proportion on the order of, for example, about 0.05 to 10% (preferably 0.1 to 3%), (dry extract weight relative to the weight of the bonding material).

The tables below show the results obtained with the use of fluidizing agents according to the invention.

TABLE A

| CONCRETE COMPOSITION | | | | 48.6% of 5/15 (gravel size, mm) 27.5% of 0/5 (sand dia., mm) 8% of fines 15.9% C P J 30 (French Std.) | | |
|---|---|---|---|---|---|---|
| | AMOUNT parts per thousand (dry wt.) | $W/C^1$ | SLUMP | REDUCT. OF WATER (wt. %) | RESISTANCE $(C)^2$ in megaPascals (MPa) | |
| | | | | | 24 Hrs | 28 Days |
| Reference Solution | — | 0.54 | 7.5 | — | 2.8 | 31.3 |
| *PNS | 2.25 | 0.5 | 7.0 | 8.1 | 5.3 | 36.0 |
| **M.M. | 2.25 | 0.48 | 7.0 | 10.6 | 6.8 | 38.3 |
| Ex. 1 | 2.25 | 0.48 | 7.5 | 10.6 | 8.8 | 38.6 |
| Ex. 2 | 2.25 | 0.46 | 7.5 | 15.1 | 9.2 | 39.0 |

TABLE A-continued

| CONCRETE COMPOSITION | | | 48.6% of 5/15 (gravel size, mm) 27.5% of 0/5 (sand dia., mm) 8% of fines 15.9% C P J 30 (French Std.) | | |
|---|---|---|---|---|---|
| AMOUNT parts per thousand (dry wt.) | W/C[1] | SLUMP | REDUCT. OF WATER (wt. %) | RESISTANCE (C)[2] in megaPascals (MPa) | |
| | | | | 24 Hrs | 28 Days |
| *PNS 4.50 | 0.47 | 7.5 | 12.2 | 7.0 | 37.8 |
| **M.M. 4.50 | 0.46 | 7.0 | 15.1 | 9.3 | 41.7 |
| Ex. 1 4.50 | 0.445 | 9.0 | 17.4 | 12.3 | 42.7 |
| Ex. 2 4.50 | 0.44 | 8.5 | 18.6 | 12.6 | 43.0 |

[1]W/C: W = total qty. resin solution + added water
[2]C = compression reqd. to split hardened concrete
*PNS = resinous polynaphthylene sulfonate
**M.M. = resinous melamine bisulfite

TABLE B

Same Concrete Composition as Table A with C P A 65

| | AMOUNT parts per thousand (dry wt.) | W/C[1] | SLUMP | REDUCT. OF WATER (wt. %) | RESISTANCE (C)[2] in megaPascals (MPa) | |
|---|---|---|---|---|---|---|
| | | | | | 24 Hrs | 28 Days |
| Reference Solution | | 0.54 | 7.5 | | 12.7 | 46.0 |
| *PNS | 2.25 | 0.5 | 7.0 | 7.0 | 16.1 | 46.5 |
| **M.M. | 2.25 | 0.48 | 7.0 | 10.5 | 15.2 | 52.8 |
| Ex. 1 | 2.25 | 0.48 | 7.5 | 10.5 | 18.3 | 54.2 |
| Ex. 2 | 2.25 | 0.47 | 8.0 | 12.7 | 18.7 | 55.3 |
| *PNS | 4.50 | 0.48 | 8.5 | 10.5 | 18.0 | 49.5 |
| **M.M. | 4.50 | 0.465 | 7.0 | 14.0 | 17.2 | 55.8 |
| Ex. 1 | 4.50 | 0.465 | 9.0 | 14.0 | 19.8 | 56.9 |
| Ex. 2 | 4.50 | 0.46 | 8.5 | 15.1 | 20.1 | 57.7 |

[1], [2], *, **see Table A

TABLE C

Same Concrete Composition as Table A with C P A 55 to 30% ash

| | AMOUNT parts per thousand (dry wt.) | W/C[1] % | FLU- IDITY to 5' | RESISTANCE (C)[2] in mega Pascals | | | |
|---|---|---|---|---|---|---|---|
| | | | | 24 Hrs. | | 28 Days | |
| | | | | C | F | C | F |
| Reference Solution | | 0.5 | 14"8 | 5.0 | 0.5 | 37.0 | 7.4 |
| *PNS | 2.25 | 0.5 | 7" | 5.1 | 0.5 | 37.5 | 7.4 |
| **M.M. | 2.25 | 0.5 | 8" | 5.5 | 0.8 | 38.9 | 7.5 |
| Ex. 1 | 2.25 | 0.49 | 7"2 | 6.8 | 1.9 | 45.6 | 8.0 |
| Ex. 2 | 2.25 | 0.49 | 7" | 6.9 | 2.1 | 46.7 | 8.3 |
| *PNS | 4.50 | 0.49 | 6"9 | 7.0 | 1.8 | 48.3 | 7.0 |
| **M.M. | 4.50 | 0.49 | 7"2 | 7.3 | 2.1 | 48.5 | 7.2 |
| Ex. 1 | 4.50 | 0.43 | 5"6 | 12.5 | 3.4 | 60.8 | 8.0 |
| Ex. 2 | 4.50 | 0.42 | 5"2 | 13.2 | 3.6 | 61.7 | 8.2 |
| Reference Solution | | 0.5 | 15"4 | 6.7 | 1.2 | 41.0 | 6.9 |

[1], [2], *, **see Table A

TABLE D

Same Concrete Composition with CPASS of 30% limestone

| | AMOUNT parts per thousand (dry wt.) | W/C[1] % | FLU- IDITY to 5' | RESISTANCE (C)[2] in mega Pascals | | | |
|---|---|---|---|---|---|---|---|
| | | | | 24 Hrs. | | 28 Days | |
| | | | | C | F | C | F |
| Reference Solution | | 0.5 | 9"2 | 5.9 | 1.2 | 37.3 | 6.2 |
| *PNS | 2.25 | 0.49 | 5"2 | 5.2 | 0.8 | 34.6 | 6.4 |
| **M.M. | 2.25 | 0.49 | 7"4 | 7.0 | 2.0 | 37.5 | 6.5 |
| Ex. 1 | 2.25 | 0.48 | 6"2 | 7.8 | 2.2 | 42.1 | 6.6 |
| Ex. 2 | 2.25 | 0.48 | 5"8 | 7.6 | 2.4 | 42.7 | 6.8 |
| Reference Solution | | 0.5 | 12"8 | 6.1 | 1.1 | 39.1 | 6.3 |
| *PNS | 4.50 | 0.47 | 5"6 | 6.4 | 1.5 | 44.5 | 6.5 |
| **M.M. | 4.50 | 0.47 | 8" | 8.4 | 3.3 | 46.4 | 7.0 |
| Ex. 1 | 4.50 | 0.43 | 5"6 | 12.7 | 3.5 | 53.5 | 7.5 |
| Ex. 1 | 4.50 | 0.42 | 5"2 | 13.1 | 3.6 | 53.9 | 7.8 |

[1], [2], *, **see Table A

Although the invention has been described with reference to particular compounds, compositions, proportions, and parameters, it must be understood that the invention is not limited to the particulars disclosed and extends to all equivalents within the scope of the claims.

I claim:

1. A method of synthesizing a fluidizing agent for hydraulic bonding materials in a single step which comprises reacting in aqueous solution:

(1) an aminosulfonic acid having at least one aromatic nucleus;

(2) a nitrogenous compound having at least two $NH_2$ functions; and (3) formaldehyde or compounds which generate formaldehyde under reaction conditions;

at a temperature ranging from about 40° C. to about 115° C. for about one hour, so as to result in the condensation thereof, to form a condensation product capable of functioning as a fluidizing agent for hydraulic bonding materials.

2. The method as defined by claim 1 wherein said nitrogenous compound is selected from the group consisting of polyamino acids, polyamides, and polythioamides, and the mono- or polymethylol derivatives of polyamino acids, polyamides and polythioamides.

3. The method as defined by claim 1 wherein said aminosulfonic acid comprises a mixture of an aminosulfonic acid having one aromatic nucleus and an aminosulfonic acid having more than one aromatic nucleus.

4. The method as defined by claim 1 wherein said nitrogenous compound has the formula $(NH_2)_zB$, where z is an integer greater than or equal to 2 and B is a triazinyl radical.

5. The method as defined by claim 4 wherein said nitrogenous compound is selected from the group consisting of diaminotriazine, melamine, guanamine, succinoguanamine, and mixtures thereof.

6. The method according to claim 1 wherein said aminosulfonic acid has the formula $(NH_2)_x(SO_3H)_yA$, where x and y are integers at least equal to 1 and A is a mono- or polynuclear aromatic radical.

7. The method as defined by claim 6 wherein said aminosulfonic acid is selected from the group consisting of sulfanilic acid, toluidine sulfonic acid, aminophenol sulfonic acid, and 2-amino-4-chlorophenyl-6-sulfonic acid.

8. The method as defined by claim 6 wherein said aminosulfonic acid is selected from the group consisting of aminonaphthalene sulfonic acid and its substituted equivalents.

9. The method as defined by claim 6 wherein said aminosulfonic acid is selected from the group consisting of aniline-2,5-disulfonic acid, diaminostilbene disulfonic acid, aminonaphthol disulfonic acid, aminonaphthyl trisulfonic acid, and the substituted derivatives thereof.

10. The method as defined by claim 1 wherein said aminosulfonic acid has more than one aromatic nucleus, said nuclei being linked by an aliphatic bridge or a hetero atom.

11. The method as defined by claim 1 wherein at least one of said sulfonic acid functions of said aminosulfonic acid is neutralized prior to the addition of said nitrogenous compound or formaldehyde or said formaldehyde generating compound to said solution.

12. The method as defined by claim 1 wherein said nitrogenous compound consists of one of
 (a) the group consisting of diaminotriazine, melamine, guanamine, succinoguanamine, and mixtures thereof, or
 (b) urea.

13. The method as defined by claim 12 wherein said nitrogenous compound consists of melamine.

14. The method as defined by claim 12 wherein said nitrogenous compound consists of urea.

15. A fluidizing agent prepared by the process of claim 1 consisting essentially of the condensation reaction product of:
 (a) an aminosulfonic acid having at least one aromatic nucleus;
 (b) a nitrogenous compound having at least two $NH_2$ functions; and
 (c) formaldehyde or compounds which generate formaldehyde under reaction conditions.

16. The fluidizing agent as defined by claim 15 wherein said agent is water soluble and is for use in hydraulic bonding materials including concrete, cement, anhydrites, plasters, and lime.

17. The fluidizing agent as defined by claim 15 wherein said nitrogenous compound is selected from the group consisting of polyamino organic acids, polyamides, or polythioamides, or their mono- or polymethylol derivatives.

18. The fluidizing agent as defined by claim 15 wherein said nitrogenous product is an amino acid derivative which undergoes a condensation reaction with formaldehyde.

19. The fluidizing agent as defined by claim 15 wherein said aminosulfonic acid comprises a mixture of an aminosulfonic acid having one aromatic nucleus and an aminosulfonic acid having more than one aromatic nucleus.

20. The fluidizing agent as defined by claim 15 wherein said nitrogenous compound has the formula $(NH_2)_zB$, where z is an integer greater than or equal to 2 and B is a triazinyl radical.

21. The fluidizing agent as defined by claim 15 wherein said nitrogenous compound is selected from the group consisting of diaminotriazine, melamine, quanamine, succinoguanamine, and mixtures thereof.

22. The fluidizing agent as defined by claim 15 wherein said aminosulfonic acid has the formula $(NH_2)_x(SO_3H)_yA$, where x and y are integers at least equal to 1 and A is a mono- or polynuclear aromatic radical.

23. The fluidizing agent as defined by claim 22 wherein said aminosulfonic acid is selected from the group consisting of sulfanilic acid, toluidine sulfonic acid, aminophenol sulfonic acid and 2-amino-4-chlorophenol-6-sulfonic acid.

24. The fluidizing agent as defined by claim 22 wherein said aminosulfonic acid is selected from the group consisting of aminonaphthalene sulfonic acid and substituted derivatives thereof.

25. The fluidizing agent as defined by claim 22 wherein said aminosulfonic acid is selected from the group consisting of aniline-2,5-disulfonic acid, diaminostilbene disulfonic acid, aminonaphthol disulfonic acid, aminonaphthyl trisulfonic acid and substituted derivatives thereof.

26. The fluidizing agent as defined by claim 15 wherein said aminosulfonic acid has more than one aromatic nucleus, said nuclei being linked by an aliphatic bridge or by a hetero atom.

27. The fluidizing agent as defined by claim 15 wherein said nitrogenous compound consists of one of
 (a) the group consisting of diaminotriazine, melamine, guanamine, succinoguanamine, and mixtures thereof, or
 (b) urea.

28. The fluidizing agent as defined by claim 27 wherein said nitrogenous compound consists of melamine.

29. The fluidizing agent as defined by claim 27 wherein said nitrogenous compound consists of urea.

30. A hydraulic bonding material selected from the group consisting essentially of concretes, cements, anhydrites, plasters, and lime, said material comprising the fluidizing agent of any one of claims 15–26 or 27–29.

31. A method of increasing the fluidity of a hydraulic bonding material comprising adding an effective amount of the fluidizing agent of any one of claims 15–26 or 27–29.

* * * * *